United States Patent
Maddali et al.

(10) Patent No.: US 8,072,191 B2
(45) Date of Patent: Dec. 6, 2011

(54) SHORTED ROTATING DIODE DETECTION AND PROTECTION

(75) Inventors: Vijay K. Maddali, Rockford, IL (US); Adrian E. Vandergrift, Rockton, IL (US); Sumita Tandon, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 688 days.

(21) Appl. No.: 11/968,256

(22) Filed: Jan. 2, 2008

(65) Prior Publication Data
US 2009/0167257 A1 Jul. 2, 2009

(51) Int. Cl.
*H02P 9/10* (2006.01)
(52) U.S. Cl. .......................................................... 322/59
(58) Field of Classification Search .................... 322/59, 322/44, 99, 36, 28
See application file for complete search history.

(56) References Cited

U.S. PATENT DOCUMENTS

| | | | |
|---|---|---|---|
| 4,528,493 A | 7/1985 | Spencer | |
| 4,549,128 A * | 10/1985 | Morishita et al. | 322/99 |
| 4,559,486 A | 12/1985 | Spencer | |
| 4,680,529 A * | 7/1987 | Komurasaki et al. | 322/28 |
| 5,453,901 A | 9/1995 | Lackey | |
| 5,508,601 A * | 4/1996 | Good et al. | 322/37 |
| 5,554,923 A * | 9/1996 | Maddali et al. | 322/25 |
| 5,892,342 A | 4/1999 | Friedlander | |
| 6,327,128 B1 | 12/2001 | DePetris | |
| 6,621,703 B2 | 9/2003 | DePetris | |
| 6,781,808 B2 | 8/2004 | Kumar et al. | |
| 6,803,748 B2 * | 10/2004 | Peter | 322/29 |
| 6,850,043 B1 | 2/2005 | Maddali | |
| 6,851,929 B2 | 2/2005 | Goldberg | |
| 6,876,177 B2 | 4/2005 | Namuduri | |
| 7,166,943 B2 | 1/2007 | Johnsen | |
| 2004/0150376 A1* | 8/2004 | Peter | 322/29 |
| 2005/0046397 A1* | 3/2005 | Peter | 322/44 |
| 2005/0264266 A1* | 12/2005 | Nakagawa et al. | 322/25 |

* cited by examiner

Primary Examiner — Julio Gonzalez
(74) Attorney, Agent, or Firm — Carlson, Gaskey & Olds, PC

(57) ABSTRACT

An electric generator with a rotating diode fault detection device built in that operates by comparing a voltage buildup across the exciter DC supply with a preset threshold value and determining if a fault condition is present based on the comparison.

10 Claims, 2 Drawing Sheets

SHORTED ROTATING DIODE DETECTION AND PROTECTION

BACKGROUND OF THE INVENTION

The present application relates to an aircraft power generation system, and specifically to detecting faulty rotating diodes within a rotating DC rectifier.

It is common in the aerospace industry to use a 3 phase synchronous generator to generate electrical power in an aircraft. A synchronous generator requires a rotating magnetic field to generate 3 phase voltages at its terminals. The rotating magnetic field is provided by a field winding carrying direct current (DC) current. The source for the DC current is provided by a 3 phase bridge rectifier which in turn is powered by exciter alternator. The exciter alternator is another synchronous machine that is excited by a stationary field winding current. An exciter field driver is used to control the exciter field current. The exciter field driver is part of a generator control unit. One of the functions of the generator control unit is to regulate the output voltage of the aircraft generator by controlling the exciter field current by means of the exciter field driver.

In an aircraft generator, failure of a shorted diode in the rotating bridge rectifier leads to loss of capacity to regulate the generator output voltage. This failure needs to be detected quickly to prevent further damage to the synchronous machine and any potential damage to the generator control unit that regulates the output voltage of the generator.

There are several methods in the prior art that can detect a shorted diode failure. These methods range from detecting loss of generating capacity to detecting ripple content in the exciter field current. However, these methods are relatively slow and, in aircraft generators that are designed to provide motoring function during engine start, a failed diode can be damaging to the generator control unit if not detected quickly.

Additionally, it is known that if a short circuit were to occur somewhere else in the circuit (such as in the load) it could skew the results of some detection methods and cause either false alarms, or a failure to recognize a faulty diode.

SUMMARY OF THE INVENTION

A power generating system contains an exciter driver, exciter, a rotating bridge rectifier and a main generator. The exciter driver is powered by DC voltage supply generated by rectifying the output voltage of a 3 phase Permanent Magnet Generator (PMG). Also included is a voltage buildup detection unit which can detect at least one voltage buildup characteristic across the PMG DC rectifier. Additionally contained within the power generation system is a generator controller. The generator controller compares the voltage buildup characteristic from the DC rectifier to a threshold characteristic. In the case of a shorted rotating diode, there is significant voltage buildup. If the voltage exceeds the threshold, the exciter driver is turned off by the generator controller.

These and other features of the present invention can be best understood by one skilled in the art from the following specification and drawings. A brief description of the drawings that accompany the detailed description follows.

BRIEF DESCRIPTION OF THE DRAWINGS

FIG. 2 illustrates an AC generator linked to a controller with a rotating rectifier protection circuit added in.

DETAILED DESCRIPTION OF AN EMBODIMENT

Figure 1:
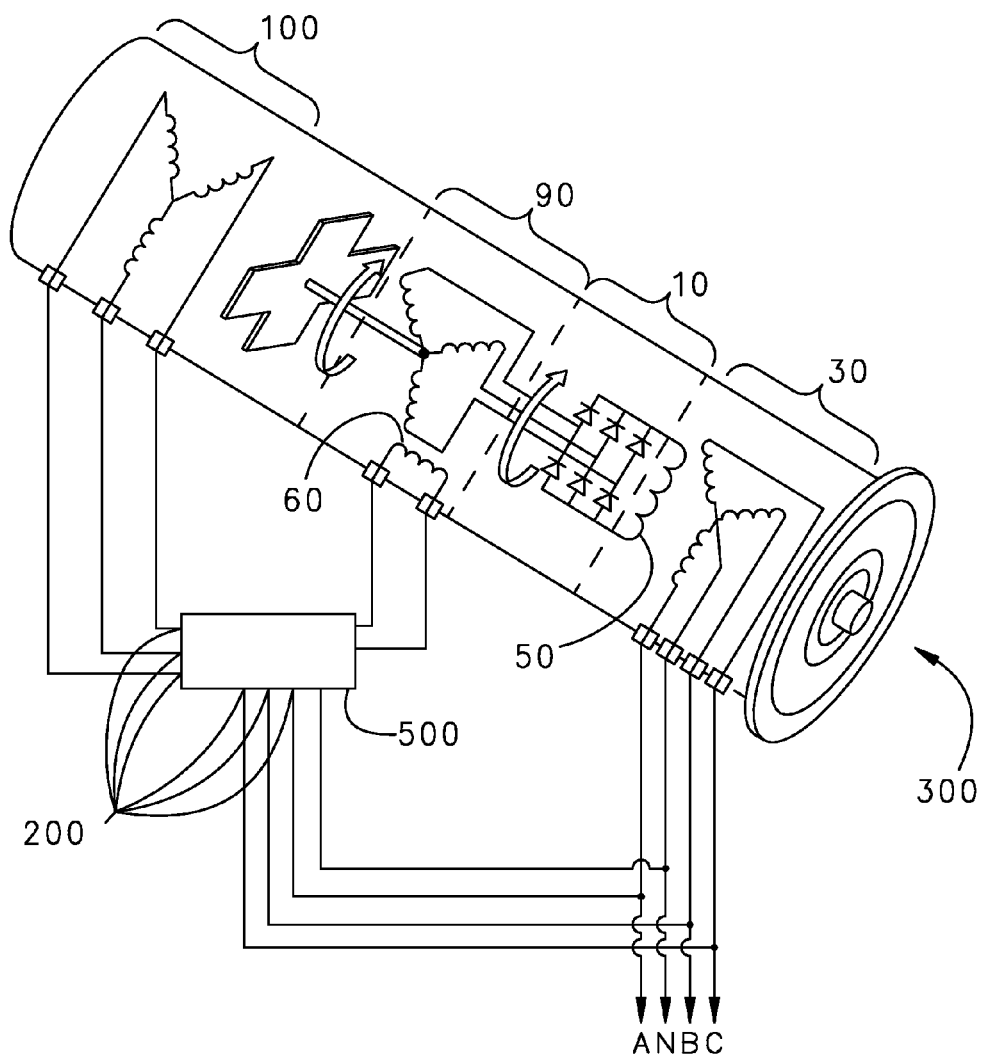
FIG. 1 illustrates a simplified AC generator.

FIG. 1 illustrates a simplified synchronous generator commonly used in the art. A generator 300 such as the one illustrated contains a rotating rectifier 10 which is between the main rotor windings 90 and the rotating field windings 50. Also shown in FIG. 1 is a generator control unit 500 which is controlling the field 60 of the exciter generator. The controller has inputs 200 relating to each of the three phases and the neutral for the main stator windings 30, and for the PMG windings 100.

Figure 2:
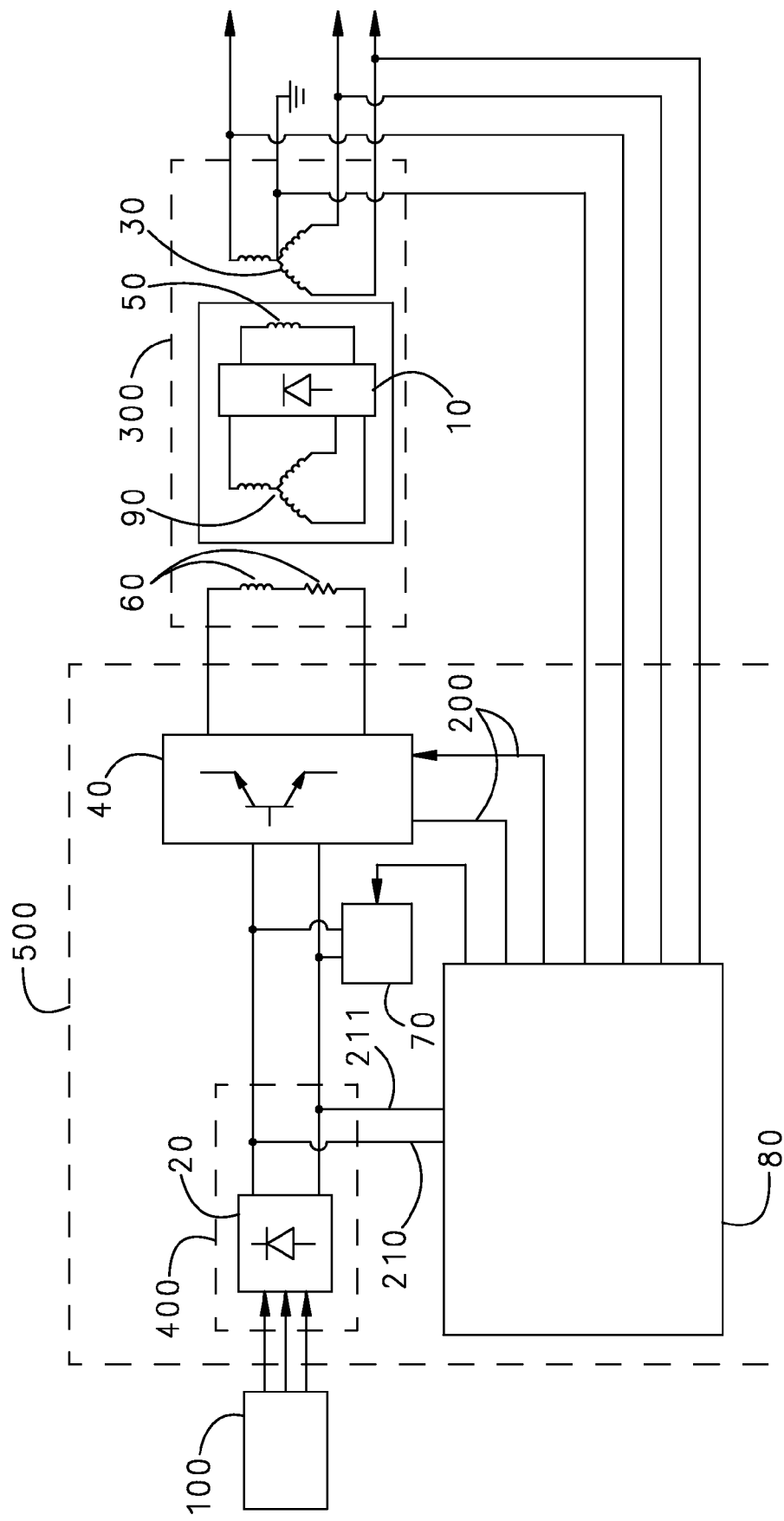

FIG. 2 illustrates in more detail the circuit for a diode fault detection and protection circuit according to one embodiment. In this circuit the generator controller 80 has additional inputs accepting a PMG DC link voltage measured across a voltage clamp 70. A faulty rotating diode can cause a voltage buildup across the DC link resulting in an increased PMG DC link voltage from the nominal. It is additionally anticipated that other measurements corresponding to the voltage buildup could be used in place of the voltage clamp 70 measurement and achieve the same result.

When the voltage buildup sensor 400 detects a voltage buildup, a signal is sent along wires 210 and 211 to the generator controller 80 indicating the level of voltage buildup detected. The generator controller 80 then checks the voltage buildup level against a preset threshold voltage buildup level and determines if a fault condition is present based on that comparison. Alternatively the generator controller 80 could check the rate of increase in buildup voltage to determine if a fault condition is present. It is also anticipated that both a voltage buildup rate and voltage buildup level could be checked to create a more robust system.

Voltage clamps, such as the voltage clamp 70 utilized in the illustrated embodiment of FIG. 2, work by limiting the voltage across themselves to a maximum value. The voltage clamp 70 is connected in parallel with the device that the user desires to clamp. In this case the voltage clamp 70 is connected in parallel to the rectifier 20. Limiting the voltage across the voltage clamp 70 has the effect of simultaneously limiting the voltage across anything that is connected to it in parallel. Some voltage clamps can only handle a certain amount of power before they start allowing an increase in voltage above their clamping value. This type of voltage clamp is called a limited authority voltage clamp. One embodiment of the current design utilizes the power limit in that it allows the voltage clamp 70 to remove voltage buildup that occurs as a result of fault conditions at or in the load, while simultaneously allowing voltage buildup as a result of a rotating diode fault. This use is possible because the voltage buildup across the voltage clamp in a rotating diode fault would exceed the voltage clamp's power limit.

After the generator controller 80 receives an input signal along wires 210 and 211 containing the voltage buildup measurements, the generator controller 80 checks those measurements against a preset threshold. In one embodiment the threshold used is a magnitude of voltage buildup. In this embodiment if the measured voltage buildup magnitude exceeds the preset threshold magnitude, then the generator controller 80 determines that there has been a rotating diode fault. In an alternative embodiment the generator controller 80 checks the rate of change of the measured voltage buildup to determine if the rate of change is above a preset threshold rate of change. In this embodiment if the rate of change is exceeded, then the generator controller 80 determines that there has been a rotating diode fault. In still a third embodiment the generator controller 80 checks both the measured voltage buildup magnitude and the rate of change of the voltage buildup. In this third embodiment, as in the other two embodiments, a value exceeding the threshold indicates that there is a diode fault in the rotating rectifier 10 component.

In addition to a voltage buildup sensor 400 measuring the voltage buildup, the measured value is transmitted to a generator controller 80. The generator controller 80 checks for a diode fault. If a diode fault is detected, then the software sends a signal to the exciter field driver 40 tripping the exciter field driver 40. When the exciter field driver 40 is tripped the exciter generator is turned off. This effectively de-energizes the circuit. De-energizing the circuit prevents the continued application of power to the faulty diode within the rotating rectifier 10. Additional attempts to apply power to the exciter field driver 40 would fail as long as it remained tripped. This prevents the faulty diode from allowing any harm to the generator control unit 500 or to any other component as a result of the fault condition and allows a person to safely perform the appropriate maintenance to fix the problem.

Although the above describes an application in an aircraft starter generator, it is anticipated that various embodiments could operate in any system with a controller and where diode fault conditions are possible.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. An electric power generating system comprising:
an exciter field driver;
at least one DC rectifier section connecting a generator and said exciter field driver;
a voltage buildup detection unit comprising a voltage buildup sensor capable of detecting a voltage buildup characteristic across a voltage clamped component wherein a voltage across said voltage clamped component is forced to a non-zero voltage clamp value when an input voltage of said voltage clamped component exceeds a clamp voltage and wherein said voltage clamped component comprises said at least one DC rectifier section; and
a controller configured to be capable of checking said voltage buildup characteristic against a threshold characteristic.

2. The electric power generating system of claim 1 further comprising a circuit tripping device capable of performing an action in response to a signal from said controller.

3. The electric power generating system of claim 2 further comprising said circuit tripping device configured to be capable of disconnecting said exciter unit from a power source upon receipt of a predetermined control signal.

4. The electric power generating system of claim 2 wherein said controller is capable of outputting a control signal when said voltage buildup characteristic exceeds a preset threshold value.

5. The electric power generating system of claim 1 wherein said controller is further configured to determine a voltage buildup rate based on at least one voltage buildup characteristic.

6. The electric power generating system of claim 1 wherein said voltage buildup characteristic is a voltage buildup rate and said voltage buildup detection unit further comprises:
said controller additionally capable of checking said detected voltage buildup rate against a preset voltage buildup rate; and
said controller additionally having at least one output for outputting a control signal indicating a fault condition.

7. An electric power generating system comprising:
an exciter field driver;
at least one DC rectifier section connecting a generator and said exciter field driver;
a voltage buildup detection unit comprising a circuit configured to detect a voltage buildup level across said at least one DC rectifier section;
a controller having a system for checking said voltage buildup level against a voltage buildup level threshold; and
said controller having at least one output for outputting a signal indicating a diode fault condition.

8. The electric power generating system of claim 7 wherein said controller is further configured to be capable of determining a voltage buildup rate based on said voltage buildup level.

9. The electric power generating system of claim 7 further comprising a voltage clamping device configured to restrict voltage across said at least one DC rectifier section to a preset voltage when no fault condition is present.

10. The electric power generating system of claim 9 further comprising said voltage clamping device being a limited authority voltage clamping device.

* * * * *